Figure 1:
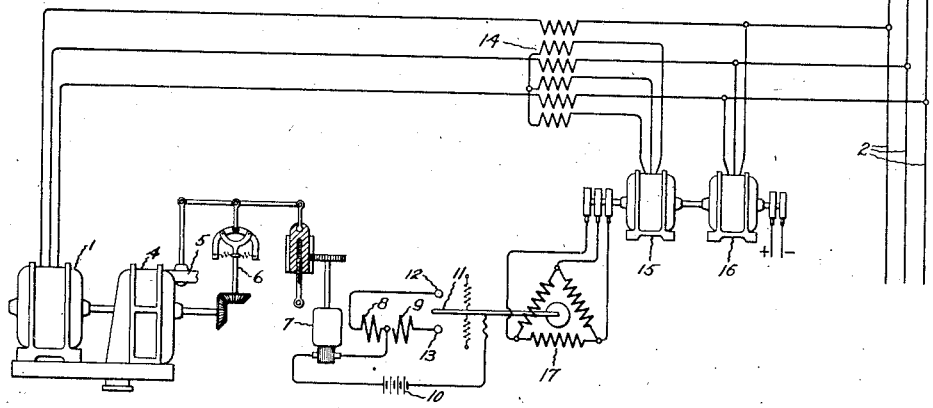

Oct. 5, 1937.   G. BELFILS ET AL   2,095,120
ELECTRIC POWER TRANSMISSION SYSTEM
Original Filed June 5, 1936

Inventors:
Georges Belfils,
Pierre G. Laurent,
by Harry E. Dunham
Their Attorney.

Patented Oct. 5, 1937

2,095,120

UNITED STATES PATENT OFFICE 2,095,120

ELECTRIC POWER TRANSMISSION SYSTEM

Georges Belfils and Pierre G. Laurent, Belfort, France, assignors to General Electric Company, a corporation of New York Application June 5, 1936, Serial No. 83,744. Renewed July 29, 1937. In France June 28, 1935

9 Claims. (Cl. 290—4)

Our invention relates to electric power transmission systems and more particularly to the transmission of electric power between synchronous machines or systems.

In long distance polyphase power transmission systems, the impedance of the lines and transformers that interconnect the synchronous machines can attain rather high values so that surges caused, for example, by sudden overloads, by short-circuits to ground or between phases, or by the sudden elimination of certain interconnecting circuits can bring about a falling out of synchronism or an asynchronous condition of operation between various machines that operated originally in synchronism. Under such circumstances, the synchronous machines of a network may become subdivided into one or more groups, the machines of each group remaining in synchronism with each other, but being out of synchronism as regards those of the other groups.

Means are known which permit reducing, as much as possible, the chances of falling out of step but experience shows, however, that notwithstanding the use of the various known means, interruptions of synchronism may occur, either because of some incident at the moment the transmitted power is very high, or when networks of large capacity are interconnected by tielines of high impedance. It is undesirable to permit asynchronous operation for any length of time since it causes important disturbances in the operation of the systems and gives rise to dangerous overvoltage, overcurrent, or excessive temperature conditions.

It is an object of our invention to provide a new and improved method and apparatus for obtaining automatic resynchronization of synchronous machines or groups of synchronous machines of a power transmission system between which synchronism has ceased.

It has been the practice heretofore after a certain period of sustained asynchronous operation in a synchronous system to disconnect the machine or groups of machines operating asynchronously with the system and then to control the disconnected machine, or machines, without permitting an exchange of power with the system until the voltage, phase and frequency of the disconnected machine are proper for resynchronization. In accordance with our invention we maintain the system intact for power interchange and employ means that react to the deviations in the frequencies of the current interchanges between the machines and system that have fallen out of step to influence speed regulating means of the prime movers of the synchronous generators operating asynchronously so as to decrease the frequency differences until synchronism is reestablished with the system. In accordance with one of the illustrated embodiments of our invention, we employ means dependent upon the slip frequency between the currents of the respective machines and a quantity corresponding to the phase of the voltage of one of the machines or systems to control prime mover speed regulating means. In accordance with another illustrated embodiment, we employ means responsive to the direction of the average power between machines during a period of predetermined maximum current to control the prime mover speed regulating means.

Figure 2:
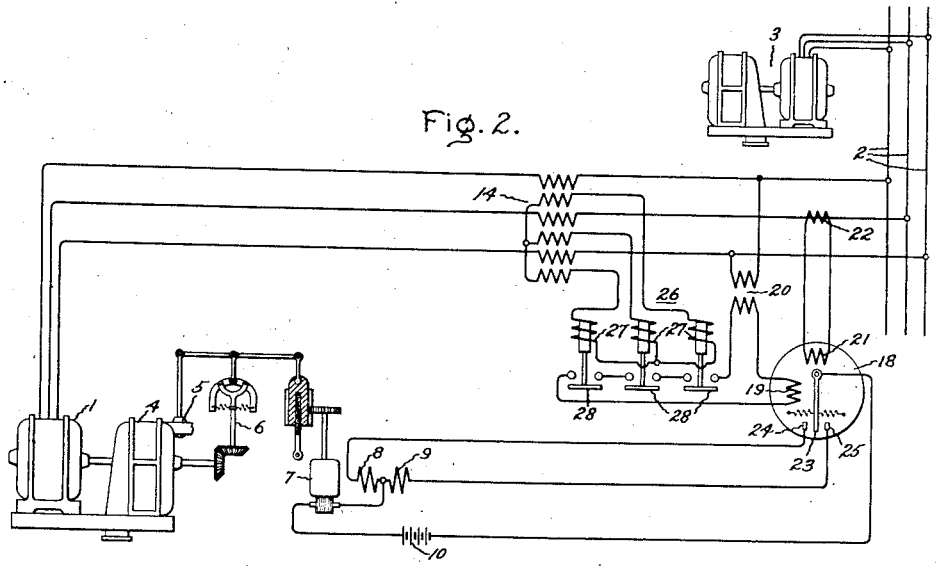

Our invention will be better understood from the following description taken in connection with the accompanying drawing in which Fig. 1 is a diagrammatic illustration of one embodiment of our invention and Fig. 2 is a diagrammatic illustration of a different embodiment of our invention.

Referring to Fig. 1 of the drawing, a synchronous alternating current generator 1 is connected to an alternating current network 2 including other synchronous generators indicated by the generator 3. The generator 1 is coupled to a prime mover 4, such as a steam turbine, which is supplied with operating fluid through a valve or gate 5 maintained in a position dependent upon the turbine speed by means comprising a governor 6 operated in accordance with the turbine speed. A pilot motor 7 is arranged to control the setting of the governor 6 and is provided with oppositely wound field windings 8 and 9 which are arranged to be connected to a source of current indicated by the battery 10 through a contact member 11 which engages stationary contacts 12 or 13 converted respectively to the field windings 8 and 9.

In accordance with this embodiment of our invention, the direction of movement of the control member 11 is dependent upon the slip frequency between the currents of the generator 1 and the network 2 and one of the voltages of the generator or network. In order to obtain a quantity variable with the slip frequency between the generator 1 and the network 2, we may utilize a current or a potential transformer and as illustrated we connect in series relation with the alternator 1 the primary winding of a three-phase current transformer 14 having its secondary winding connected to energize the stator winding of a machine 15 constructed as an asynchronous motor with a wound rotor. The rotor of machine 15 is driven by a synchronous motor 16 which is connected to be energized at some point in the system to operate at a speed corresponding to the synchronous frequency of the system or the frequency of the generator 1. The point of connection will be dependent upon the location of the reactance center of the system. If the synchronous motor 16 operates at the frequency of the network it constitutes the means for establishing a reference quantity corresponding to the phase position of a voltage of the network with which the slip frequency is compared. On the other hand, if the synchronous motor 16 is so connected as to operate at the frequency of the generator it constitutes means for establishing a reference quantity corresponding to the phase position of a voltage of the generator 1. It will thus occur to those skilled in the art that the rotor of the asynchronous machine 16 could be driven from the shaft of generator 1, or that the machines 15 and 16 could be combined into one single machine that combines these characteristics without departing from our invention in its broader aspects. The rotor of the machine 15 is connected to a suitable relay 17, shown in the form of a torque motor an arm of which carries the movable contact 11 cooperating with the stationary contacts 12 and 13, previously described, which respectively control the energization of the field windings 8 and 9 of the pilot motor 7.

A general analysis of the slip frequency response is based on the theory that the current in an element of a network is at any instant equal to the resultant of all the components of current which, in that network element, would be established for each one of the electromotive forces acting alone. More particularly, if the network is supplied by two systems 1 and 2, the currents in the network are equal to the resultant of the currents which the generators of group 1 would cause to circulate therein—the excitation of the generators of group 2 being assumed to be zero—and of the currents which the generators of group 2 would cause to circulate therein—the generators of group 1 being assumed to be zero. If there is any break in the synchronism between the two systems, the currents of frequency $f_1$, resulting from the excitation of the generators of group 1, and the currents of frequency $f_2$ which are due to the excitations of the generators 2, become superimposed at all the points of the network, and in particular at the generators themselves. If one considers, for instance, an alternator which belongs to the system with the higher frequency, say system 1, this alternator will supply, under the influence of its own excitation, currents, the frequency of which is $f_1$. Moreover, it receives currents of lower frequency $f_2$ with respect to which it operates as an asynchronous generator. According to our invention, we utilize the current of frequency $f_2$ in the windings of alternator 1 or in the neighborhood of alternator 1 to influence the speed of alternator 1 to produce substantial equality between frequencies $f_1$ and $f_2$.

The operation of the arrangement illustrated in Fig. 1 is substantially as follows: The synchronous motor 16 drives the rotor of the asynchronous machine 15 at synchronism with respect to generator 1. The currents transmitted to network 2 by the generator 1 through the series transformer 14 are, therefore, without effect on the secondary winding of machine 15. Hence relay 7 is not energized as long as network 2 is at the same frequency as generator 1. In case of a break in the synchronism between alternator 1 and the network 2, or part of it, there will take place the superposition, on the currents of frequency $f_1$ traversing the primary winding of transformer 14, of currents of the frequency $f_2$, which is slightly different. With respect to this system of currents, the machine 15 behaves as an asynchronous machine that rotates with a slip that is proportional to $f_2 - f_1$. The rotor winding of machine 15 is thus the seat of currents having a frequency $f_2 - f_1$ and relay 7 is operated in accordance with this difference. The movable arm carrying contact 11 is moved in one direction or the other with respect to its balance position depending upon whether $f_2$ is above or below $f_1$. If $f_2$ is above $f_1$ the contact 11 is moved to one of its cooperating contacts 12 or 13 so as to bring about an increase in the speed of generator 1. On the other hand, if $f_2$ is below $f_1$ the contact arm is moved to engage one of its cooperating contacts 12 or 13 to decrease the speed of generator 1. In either case this action has the effect of reestablishing synchronism between generators 1 and the network 2.

In Fig. 2 we have shown another embodiment of our invention wherein the asynchronous machine 15 of Fig. 1 is replaced by a power directional means 18 which is rendered operative only in case synchronism is broken. In this arrangement, as illustrated, corresponding parts have been given the same reference numerals as in Fig. 1. The power directional means 18 is shown in the form of a wattmeter relay comprising a voltage winding 19 energized from a potential transformer 20, and a current winding 21 energized from a current transformer 22. This relay 18 is provided with an arm carrying a contact 23 and cooperating stationary contacts 24 and 25 for operating the pilot motor in one direction or the other to increase the speed of generator 1 if the direction of power flow is toward the generator or to decrease the speed of generator 1 if the direction of power flow is in the opposite direction. In series with one of the windings of the power directional device, we insert a suitable interrupter which may, for example, take the form of a mechanical interrupter or an electronic device or relay, but which in the illustrated embodiment is shown as a current relay 26 comprising current windings 27 connected to be energized from the secondary windings of current transformer 14 and being provided with contacts 28 connected in series relation with the voltage winding 19 of the power directional device. The current relay 26 is arranged so that the power directional device can operate the pilot motor only when the slip frequency current as measured by the current transformer 14 exceeds a predetermined value.

The operation of the arrangement illustrated in Fig. 2 is substantially as follows: The superposition, in the network, of currents having a frequency $f_1$ and $f_2$ in the case of a break in synchronism between generator 1 and the network 2 corresponds to the circulation, in the primary windings of transformer 14 of a resultant current of pulsating amplitude, the frequency of the pulsation being $f_1 - f_2$. The maximum value of the amplitude of that pulsating current is attained when the currents with the frequencies $f_1$ and $f_2$ are in phase, and it is always much higher than the amplitude of the current which circulated through the line during normal operation prior to the asynchronous condition of operation. The current relay 26 is arranged to be operative to close its contacts at only those constants when the amplitude approaches a predetermined maximum. The power directional relay is, therefore, operative to close one or the other of its sets of contacts depending upon the direction of average power interchange during a period of predetermined maximum current.

It will occur to those skilled in the art that the displacement of the governor may be made to differ from the control relays or the control circuit may be arranged to totalize indications of the wattmeter during a given period of time without departing from our invention in its broader aspects. In this manner any untimely operations can be prevented in case of short-circuits, or other disturbances not associated with asynchronous operation.

While we have shown and described particular embodiments of our invention, it will occur to those skilled in the art that various changes and modifications may be made without departing from our invention and we, therefore, aim in the appended claims to cover all such changes and modifications as fall within the true spirit and scope of our invention.

What we claim as new and desire to secure by Letters Patent of the United States is:

1. The combination of a plurality of synchronous alternating current circuits, means for controlling the relative frequencies of said circuits, and means operable in accordance with an asynchronous condition of operation between said circuits for operating said first-mentioned means to restore a synchronous condition of operation between said circuits while said circuits are interconnected for interchange of power.

2. The combination of a plurality of synchronous alternating current circuits, means for controlling the relative frequencies of said circuits, and means operable in accordance with a difference in the frequencies of said circuits for operating said first-mentioned means to produce substantial equality between said frequencies while said circuits are interconnected for interchange of power.

3. In an alternating current system, a power circuit, a dynamo-electric machine connected to said circuit for synchronous operation therewith, a prime mover coupled to said dynamo-electric machine, means for controlling the power input to said prime mover, and means operable in accordance with an asynchronous condition of operation of said dynamo-electric machine relative to said circuit for operating said first-mentioned means to restore synchronous operation between said dynamo-electric machine and said circuit while said machine and circuit are interconnected for interchange of power.

4. The combination of a plurality of synchronous alternating current circuits, means for controlling the relative frequencies of said circuits, and means operative in accordance with the slip frequency between currents of the respective circuits when in asynchronous power-transmitting relation and a quantity dependent upon a voltage of one of said circuits for operating said first-mentioned means to restore a synchronous condition of operation between said circuits.

5. In an alternating current system, a power circuit, an alternating current generator connected to said circuit for synchronous operation therewith, a prime mover coupled to said generator, means for controlling the power input to said prime mover, a current transformer connected in the output circuit of said generator, an asynchronous machine having a stator winding connected to be energized from said current transformer and a rotor member including a winding, means for driving said rotor at a speed corresponding to the speed of said generator, and means responsive to an electrical characteristic of said rotor winding for controlling said first-mentioned means.

6. In an alternating current system, synchronous dynamo-electric machines included therein, means for controlling the frequency of one of said dynamo-electric machines, and means connected to be energized responsively to system current conditions and cooperating power directional responsive means connected to be energized in accordance with system current and voltage conditions for controlling the frequency controlling means of said dynamo-electric machine.

7. The combination of a plurality of synchronous alternating current circuits, means for controlling the relative frequencies of said circuits, and means operative in accordance with the direction of average power interchange between said circuits during a period of current flow above a predetermined value in one of said circuits for operating said first-mentioned means to restore a synchronous condition of operation between said circuits.

8. In an alternating current system, a power circuit, an alternating current generator connected to said circuit for synchronous operation therewith, a prime mover coupled to said generator, means for controlling the power input to said prime mover, power directional responsive means connected to said generator circuit, a current transformer connected in the output circuit of said generator, means connected to be energized from said current transformer and operative in response to current above a predetermined value for controlling the energization of said power directional means, and means controlled by said power directional means for controlling said first-mentioned means.

9. The method of resynchronizing synchronous machines in an electrical system of distribution which consists in varying the frequency of a synchronous machine operating asynchronously relative to said system until synchronism is reestablished therebetween while maintaining said system and machine interconnected for interchange of power.

GEORGES BELFILS.
PIERRE G. LAURENT.